United States Patent [19]

Gauchel

[11] 4,189,520
[45] Feb. 19, 1980

[54] SHAPED STRUCTURAL MEMBERS HAVING IMPROVED LIGHTFASTNESS AND WEATHERPROOFNESS

[75] Inventor: Peter Gauchel, Alzenbach, Fed. Rep. of Germany

[73] Assignee: Dynamit Nobel Aktiengesellschaft, Fed. Rep. of Germany

[21] Appl. No.: 850,829

[22] Filed: Nov. 11, 1977

Related U.S. Application Data

[63] Continuation-in-part of Ser. No. 400,020, Sep. 24, 1973, abandoned.

[30] Foreign Application Priority Data

Sep. 22, 1972 [DE] Fed. Rep. of Germany ....... 2246497

[51] Int. Cl.$^2$ .............................................. B32B 17/08
[52] U.S. Cl. .................................. 428/520; 52/309.1; 428/215; 428/336; 428/519; 428/522
[58] Field of Search ............... 428/515, 522, 336, 341, 428/518, 519, 520, 215, 216; 156/244; 264/176, 31; 49/504; 52/309.1

[56] References Cited

U.S. PATENT DOCUMENTS

| | | | |
|---|---|---|---|
| 3,100,917 | 8/1963 | Wagner | 52/309.1 |
| 3,194,725 | 7/1965 | Pounds | 428/215 |
| 3,220,062 | 11/1965 | Hermann | 52/309.1 X |
| 3,419,461 | 12/1968 | Gebhard et al. | 428/215 |
| 3,447,997 | 6/1969 | Kamal | 428/215 |
| 3,589,976 | 6/1971 | Erb | 428/215 |
| 3,661,685 | 5/1972 | Osteen | 156/306 X |
| 3,804,705 | 4/1974 | Kishikawa et al. | 428/518 X |
| 3,859,754 | 1/1975 | Budich et al. | 40/425 |
| 3,868,789 | 3/1975 | Gates | 49/501 |
| 4,040,219 | 8/1977 | Budich | 52/209 |

FOREIGN PATENT DOCUMENTS 557715 5/1958 Canada .
1031301 6/1966 United Kingdom .

*Primary Examiner*—P. E. Willis, Jr.
*Attorney, Agent, or Firm*—Craig and Antonelli

[57] ABSTRACT

A process for the production of shaped structural members made of extrudable thermoplastic synthetic resin suitable for use in the construction industry especially for window frames including sashes and blinds and sliding doors and the like, having a surface coating with improved lightfastness and weatherproofness, wherein a thin cover layer of a polymeric material such as a polymethyl methacrylate is provided at least on the side of the shaped member to be exposed to outside ambient conditions.

28 Claims, 1 Drawing Figure

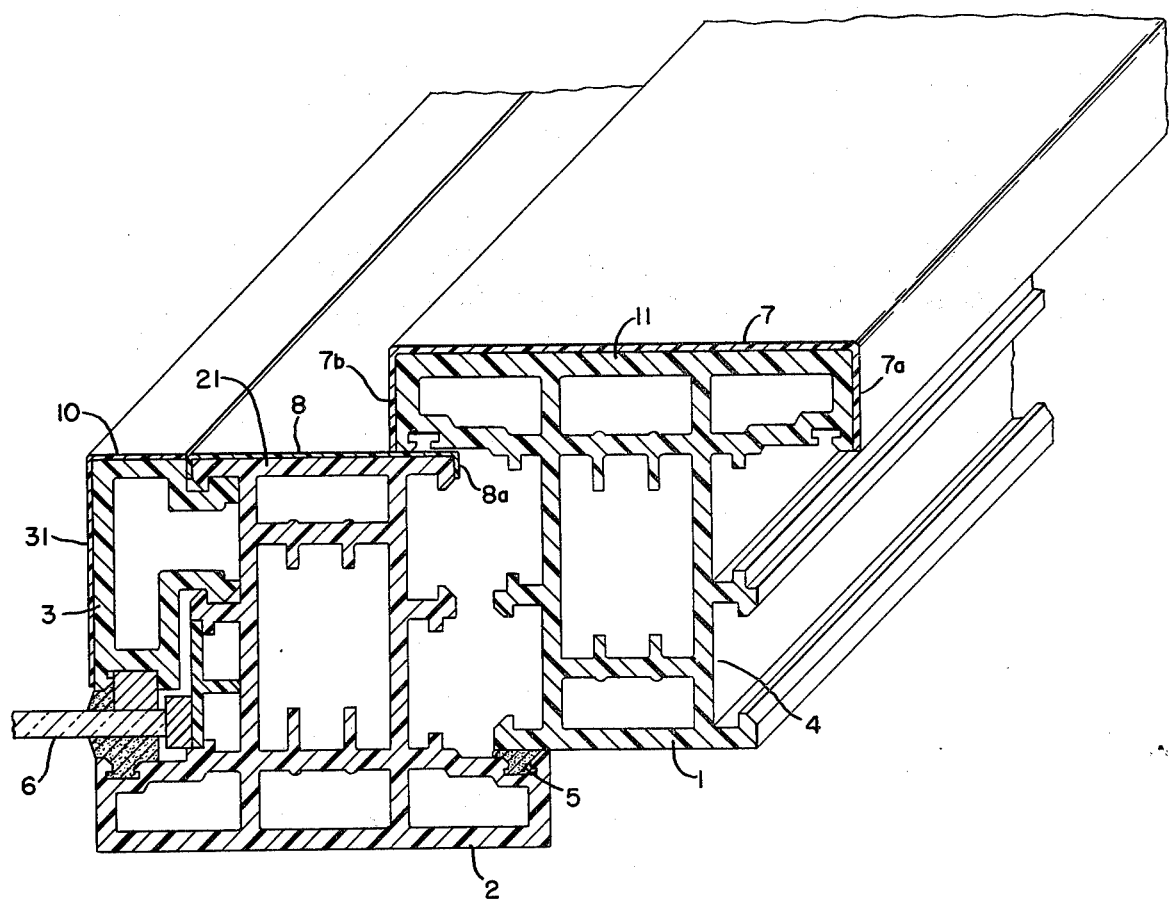

SHAPED STRUCTURAL MEMBERS HAVING IMPROVED LIGHTFASTNESS AND WEATHERPROOFNESS

This application is a continuation-in-part of prior U.S. application Ser. No. 400,020, filed Sept. 24, 1973, now abandoned.

The present invention relates to a process for the manufacture of profile members, especially shaped structural members, for use in the construction industry, e.g. window frames, of extrudable thermoplastic synthetic resins, for example, PVC (polyvinyl chloride) or ABS (acrylonitrile-butadiene-styrene resins), with a surface exhibiting improved characteristics as compared to the synthetic resin employed, such as an improved lightfastness and weatherproofness, and to profile or shaped members produced in accordance with this process.

It is known that the construction industry frequently uses in outdoor applications profile members or shaped structural members, for example, window frames or door frames, made of thermoplastic synthetic resins, such as hard PVC, i.e. polyvinyl chloride. Window frames and door frames made of thermoplastic synthetic resins are disclosed in German application No. 21 43 698 which corresponds to U.S. Pat. No. 3,859,754 to Wolfgang Budich, et al. Such profile members are exposed to numerous stresses due to weathering, wherein especially strong solar radiation, on the one hand, and temperature fluctuations on the other hand considerably stress the thermoplastic synthetic resins employed to the limits of their functionality. In the construction field, the lightproofness of the thermoplastic synthetic resins installed over a period of many years plays an important part, for optical reasons, and furthermore the weatherability of the synthetic resins, i.e. the profile members, and their behavior during exposure to fluctuating temperatures are of essential significance. It will be understood that the thermoplastic structural members are used in the construction industry, particularly those used for window frames and door frames are either hollow, single or multiple chamber members or members defining an open continuous cavity or channel.

The object of the invention is to be seen in that a process is to be suggested for the production of profile members, i.e. shaped structural members, from thermoplastic synthetic resins, by means of which a lightfastness and weatherproofness of the thus-manufactured members can be attained that are improved as compared to the synthetic resin used to form the members. The process of this invention for the manufacture of such structural members is characterized in that, at least on the side facing the weather, the member is provided with a coating of a polymethylmethacrylate homopolymer or methyl methacrylate copolymer or mixtures thereof in a thickness of preferably about 0.1 to about 1 mm. The coating of PMMA or the methyl methacrylate copolymers or a mixture thereof shows a very good adhesion to the thermoplastic synthetic resin members, for example, hard PVC, and imparts to these members an excellent lightfastness and weatherproofness. In addition, the members thus obtain a very good dyeability and brilliance, which are properties frequently desirable in the construction field for optical reasons, as well as a very high surface quality and scratch resistance, which characteristics have proven themmselves well in highly stressed components, such as window frames.

The synthetic resin profile members can be coated, for example, by extrusion coating simultaneously during the extrusion of the profile members, the prerequisite being the use of extrudable thermoplastic materials, i.e. substrate materials as well as coating materials. Especially suitable for this extrusion coating are polymethyl methacrylates, the copolymers of methyl methyacrylate or mixtures thereof having a molecular weight of preferably about 120,000 to about 180,000.

Extruded shaped members produced according to the process of this invention are distinguished in that they are joined in a firm adhesive bond over at least a portion of their outer surface with a layer of a polymethyl methacrylate (PMMA) or a methyl methacrylate copolymer, preferably in a thickness of 0.1–1 mm. The PMMA layer achieves a high brilliance of the members and, when the coating is dyed, a high color intensity and purity of the colors are obtained. Furthermore, this layer is also strongly absorbent with respect to the UV region of the spectrum, depending on the additives employed, for example, adding UV absorbent such as benzophenone or benzotriazoles to the PMMA or the copolymer. By means of such coated members, the construction industry has obtained the building components desired, which are colorfast over long years and are now essentially more resistant to weathering.

Also, the coating of thermoplastic synthetic resin shaped members with, for example, PMMA, also is advantageous considering the shrinkage due to atmospheric influences. It has been proven that PVC members coated with PMMA exhibit a lesser shrinkage tendency under the effect of elevated temperatures than PVC members which have not been coated.

It is possible by means of the process of this invention to manufacture synthetic resin members for the construction industry which, with improved properties, widen the range of utilization and simultaneously enlarge the optical design possibilities.

For pigmenting the PMMA layer, it is possible to use, beside customary coloring pigments, those pigments advantageously having a high absorption of visible light with a concomitantly high reflectance in the infrared range. By means of such pigments, the objective is attained that the heating-up caused by solar radiation is reduced, so that the weatherability of the components is increased.

It will be appreciated that more synthetic resins which can be extruded are suitable for the basic material for the load-supporting extruded profile member of the invention. These include PVC, modified PVC, extrudable ABS polymers, polyethylene, and polypropylene.

The construction, i.e. the configuration of the shaped members of this invention will be further understood from the accompanying drawing wherein:

The single FIGURE is a partial schematic cross-sectional view showing an assembly of shaped structural members, i.e. window frames components having a surface coating according to the invention; and The single FIGURE shows a combination of window frame components including a blind frame profile member 1 with a sash profile member 2 and a glass holding strip member 3. The profile members 1 and 2 are multi-chambered hollow profile members of a synthetic resin of the impact-resistant, thermoplastic type, e.g. hard PVC. Since hard PVC is not absolutely weather-resistant, the invention provides that the outer weather-exposed sides 11, 21 and 31 of the profile members 1, 2 and 3 are provided, respectively, with a cover layer 7, 8 and 10 of a polymethyl methacrylate. This is a relatively thin cover layer applied to the basic profile members 1, 2 and 3 by coextrusion. The application of such a cover layer by means of lamination is impossible in connection with profile members for window and door frames of a thermoplastic synthetic resin, since for this purpose the basic profile member would have to be heated, and the profile member would be deformed by the laminating pressure inasmuch as it has hollow chambers or cavities formed therein. Moreover, it should be noted that it is possible by coextrusion to apply the cover layer 7, 8 or 10 not only along one plane to the side which is visible, but rather also around the corners; as shown at the lateral edges 7a, 7b and 8a.

Additional details in the drawing regarding the window frame profile member are the grooves 4 at the blind frame profile member 1 that serve for attachment to the wall masonry; the projection with a groove at the sash profile member 2 for receiving and holding the glass pane 6, as well as the abutting seal 5 at the place where the sash profile 2 contacts the blind frame profile 1.

For the manufacture of the window frames or door frames, it is necessary to weld the profiles shown in the drawing together in the corners. The resulting composite provides a conventional window frame, for example, a sliding window. In order to be able to weld the illustrated window frames and door frames flawlessly together in case of a multiple-layer structure of the profile member, special requirements must be met, particularly by the cover layers 7, 8 and 10. On the one hand, the material for these cover layers must likewise be weldable; on the other hand, the cover layer must have a minimum thickness so that the material of the cover layer is not possibly pressed away at the welding zone during welding, due to the welding pressure and the weld bead.

During the welding of the corners, a weld bead is produced by the compression of the profile members making-up the window frame and this bead must be removed. It has been found in this regard, that the cover layer must have sufficient thickness to insure that the bead can be removed without destroying the cover layer. However, on the other hand, the cover layer must not be too thick, either. These conditions are fulfilled in an optimum way by applying the cover layers 7, 8 and 10 by coextrusion. A colored cover layer which, for example, is applied by spraying or varnishing is much too thin and could not provide the required properties. Also, it will be appreciated that it is advantageous to provide the cover layer of the window frame with a different color than the basic profile members making up the frame assembly so that two-colored window frames are produced. For coloring the cover layer, as heretofore described, the customary coloring pigments, such as organic or inorganic pigments or organic dyestuff, may be used. Also, the invention contemplates the advantageous use of color pigments which reflect infrared light, since such pigments reduce the heating up of the components due to sun radiation. Such infrared-reflecting pigments can be organic as well as inorganic pigments, for example, anthraquinone black pigments, phthalocyanine pigments, chrome yellow [chromate of lead], mineral fire red [mainly ferric oxide, $Fe_2O_3$], and chromic oxide green.

The process and products of this invention will be further understood from the following examples:

EXAMPLE 1

A hard polyvinyl chloride resin (PVC) is blended with conventional additives including light and heat stabilizers such as complex barium-cadmium soaps and then melt extruded at temperatures of from 190° C. to 210° C. to an endless shaped profile member, which is cut to long pieces which are welded together at the corners to form a rectangular window frame in a conventional manner. During this extrusion a coating of polymethyl methacrylate having a molecular weight of 160,000 is melt extruded onto the outer face of the frame to provide a coating having a thickness of 0.5 mm. Subsequently, the coating is dyed with an organic color pigment. The resultant PMMA coated frame was then exposed to outside ambient weather conditions for a period of 6 months and found to exhibit improved lightfastness and freedom from surface imperfections.

EXAMPLES 2 to 10

Additional structural members to complete the window frames are made using the hard polyvinyl chloride resin and are coated with polymethyl methacrylate and then dyed as in Example 1. For purposes of comparison, Examples 10, 19 and 28 show the results of the tests on a profile member without any coating.

These examples and the results thereof are tabulated below:

TABLE 1

Evaluation of Window Profile Members After Each Outdoor Exposure in Germany and United States

| Experiment No. | Sample No. | Color | Troisdorf ½ Yr. | 1 Yr. | Spiekeroog ½ | Florida ½ | Arizona ½ Yr. |
|---|---|---|---|---|---|---|---|
| 2 | 1336 | grey | 0 | 0 | 0 | 0 | |
| 3 | 1337 | black | 0 | 0 | 0 | 0 | 0 |
| 4 | 1338 | brown | 0 | 0 | 0 | 0 | |
| 5 | 1340 | white | 0 | 0 | 0 | D 0-1 | 0 |
| 6 | 1341 | orange | 0 | 0 | 0 | 0 | |
| 7 | 1342 | red | 0 | 0 | 0 | 0 | 0 |
| 8 | 1346 | olive | 0 | 0 | 0 | 0 | |
| 9 | 1347 | anthracite | 0 | 0 | 0 | 0 | |
| 10 | 1349 | white | 0 | 0 | 0 | D 0-1 | 0 |

0 = no change
D = darkening
Index strength of = 1, 2, 3 etc.

EXAMPLES 11 to 19

TABLE 2

Evaluation of Window Profile Members by Weather-Ometer Exposure

| Experiment No. | Sample No. | Color | 1000 | 2000 | 3000 kwh. |
|---|---|---|---|---|---|
| 11 | 1336 | grey | 0 | 0 | 0 |
| 12 | 1337 | black | 0 | 0 | 0 |
| 13 | 1338 | brown | 0 | 0 | 0 |
| 14 | 1340 | white | 0 | 0 | 0 |
| 15 | 1341 | orange | 0 | 0 | B 1 |
| 16 | 1342 | red | 0 | D-1 | D 1 |
| 17 | 1346 | olive | 0 | 0 | 0 |
| 18 | 1347 | anthracite | 0 | 0 | 0 |
| 19 | 1349 | non-white | 0 | 0 | D 1 |

0 = no change
B = fading
D = darkening
Index = strength 1, 2, 3...

EXAMPLES 20-28

TABLE 3

Evaluation of Window Profile Members by Fade-Ometer Exposure

| Experiment No. | Sample No. | Color | 500 | 1000 | 1500 | 2000 | 2500 | 3000 | 3500 | 4000 | 4500 | 5000 | 5500 | 6000 | 6500 | 8500 | 9000 | 9500 | kwh. 10,000 |
|---|---|---|---|---|---|---|---|---|---|---|---|---|---|---|---|---|---|---|---|
| 20 | 1336 | grey | 0 | 0 | 0 | 0 | 0 | 0 | 0 | 0 | 0 | 0 | 0 | 0 | 0 | 0 | 0 | 0 | 0 |
| 21 | 1337 | black | 0 | 0 | 0 | 0 | 0 | 0 | 0 | 0 | 0 | 0 | 0 | 0 | 0 | 0 | 0 | 0 | 0 |
| 22 | 1338 | brown | 0 | 0 | 0 | 0 | 0 | 0 | 0 | 0 | 0 | B1 | B2 | B2 | B2-3 | | | | |
| 23 | 1340 | white | 0 | 0 | 0 | 0 | D1 | D1-2 | D2 | D3 | | | | | | | | | |
| 24 | 1341 | orange | 0 | 0 | D4 | D4 | | | | | | | | | | | | | |
| 25 | 1342 | red | 0 | 0 | 0 | 0 | 0 | B2 | B2/D3 | B2/D3 | B2/Ds | | | | | | | | |
| 26 | 1346 | olive | 0 | 0 | 0 | 0 | 0 | 0 | 0 | 0 | 0 | 0 | 0 | 0 | 0 | 0 | 0 | 0 | 0 |
| 27 | 1347 | anthracite | 0 | 0 | 0 | 0 | 0 | 0 | 0 | 0 | 0 | 0 | 0 | 0 | 0 | 0 | 0 | 0 | 0 |
| 28 | 1349 | white | B1 | D4 | D4 | D4 | | | | | | | | | | | | | |

O = no change
B = fading
D = darkening
Index strength of = 1,2,3, etc.

In the foregoing examples the white color pigments used include titanium and barium sulfate. The yellow color pigments include lead chromate, nickel titanium yellow and cadmium yellow; the red color pigment is cadmium red; the blue color pigment is phthalocyanin; the black color pigments are carbon black (soot) and anthraquinone black. The secondary colors are mixtures of these color pigments.

From the above data it is apparent that the process of this invention provides improved weather proofness to thermoplastic polymeric profile members.

Furthermore, it will also be appreciated that homopolymers of polymethyl methacrylate are readily obtained through polymerization of methyl methacrylate alone; whereas the methyl methacrylate copolymers are obtained by copolymerization of a major proportion of methyl methacrylate with butyl acrylate such as phenyl acrylate, e.g. ethyl acrylate or an aryl acrylate such as phenyl acrylate in a conventional manner. Exemplary of suitable copolymers are those prepared from monomeric mixtures containing from 60 to 100 weight % of methyl methacrylate and from 40 to 0 weight % of the other alkyl alkylate or aryl acrylate.

While the novel principles of the invention have been described it will be understood that various omissions, modifications and changes in these principles may be made by one skilled in the art without departing from the spirit and scope of the invention.

What is claimed is:

1. A process for the production of shaped structural channel-forming members of extrudable thermoplastic synthetic resins for use in the assembly of window frames and like frame assemblies with a surface coating layer having improved weathering characteristics as compared to the surface of the synthetic resin, said coating layer exhibiting improved lightfastness and weatherproofness, which comprises providing a thin coating layer directly onto at least the side of the shaped member to be exposed to outside ambient conditions, of a polymeric material selected from the group consisting of a polymethyl methacrylate homopolymer, a methyl methacrylate copolymer and mixtures thereof, said thin coating layer being provided directly on said shaped member by co-extrusion of said polymeric material simultaneously with extrusion of the shaped member.

2. The process according to claim 1, in which the polymethyl methacrylate homopolymer or the methyl methacrylate copolymer used for producing the coating layer has a molecular weight of about 120,000 to about 180,000.

3. The process according to claim 2, in which said thin coating has a thickness of from about 0.1 to about 1 mm.

4. The process according to claim 1, in which the shaped structural member is a window frame member or a door frame member.

5. The process according to claim 1, in which the extrudable thermoplastic synthetic resins include polyvinyl chloride and acrylonitrile-butadiene-styrene resins.

6. The process according to claim 1, wherein said synthetic resin is selected from the group consisting of polyvinyl chloride, acrylonitrile-butadiene-styrene, polyethylene and polypropylene.

7. The process according to claim 1, wherein said methyl methacrylate copolymer is obtained by copolymerization of a major portion of methyl methacrylate with another copolymerizable monomer selected from the group consisting of alkyl acrylate and aryl acrylate.

8. The process according to claim 7, wherein said copolymerizable monomer is selected from the group consisting of butyl acrylate, ethyl acrylate and phenyl acrylate.

9. The shaped member according to claim 7, in which the polymethyl methacrylate homopolymers or the methyl methacrylate copolymers have a molecular weight of about 120,000 to about 180,000.

10. The process according to claim 1, in which the methyl methacrylate polymer is prepared from a monomeric mixture containing from 60 to 100 weight % of methyl methacrylate and from 40 to 0 weight % of another copolymerizable monomer selected from the group consisting of alkyl acrylate and aryl acrylate.

11. The process according to claim 10, wherein said copolymerizable monomer is selected from the group consisting of butyl acrylate, ethyl acrylate, and phenyl acrylate.

12. The shaped member according to claim 9, in which the polymethyl methacrylate homopolymer or methyl methacrylate copolymer is prepared from a monomeric mixture containing from 60 to 100% of methyl methacrylate and from 40 to 0% of another polymerizable monomer selected from the group consisting of alkyl acrylate and aryl acrylate.

13. The shaped member according to claim 12, wherein said polymerizable monomer is selected from the group consisting of butyl acrylate, ethyl acrylate, and phenyl acrylate.

14. The shaped member according to claim 13, in which the polymethyl homopolymer or methyl methacrylate copolymer is prepared from a monomeric mixture containing from 60 to 100% of methyl methacrylate and from 40 to 0% of another polymerizable monomer selected from the group consisting of alkyl acrylate and aryl acrylate.

15. The shaped member according to claim 14, wherein said polymerizable monomer is selected from the group consisting of butyl acrylate, ethyl acrylate, and phenyl acrylate.

16. A shaped window frame or door frame channel-forming member of extruded thermoplastic synthetic resin having a thin coextruded surface coating layer exhibiting improved characteristics as compared to the surface of synthetic resin employed, said coating layer exhibiting improved lightfastness and weatherproofness being arranged directly on at least a side of the shaped member to be exposed to outside ambient conditions, and comprising a polymeric material selected from the group consisting of a polymethyl methacrylate homopolymer, a methyl methacrylate copolymer and mixtures thereof.

17. The shaped member according to claim 16, in which said thin coating layer has a thickness of from about 0.1 to about 1 mm.

18. The shaped member according to claim 16, wherein said shaped member is formed from an extrudable thermoplastic synthetic resin selected from the group consisting of polyvinyl chloride, acrylonitrile-butadiene-styrene, polyethylene and polypropylene.

19. The shaped member according to claim 16, wherein said methyl methacrylate copolymer is obtained by copolymerization of a major portion of methyl methacrylate with another copolymerizable monomer selected from the group consisting of alkyl acrylate and aryl acrylate.

20. The shaped member according to claim 19, wherein said copolymerizable monomer is selected from the group consisting of butyl acrylate, ethyl acrylate and phenyl acrylate.

21. In a shaped window frame or door frame member made from an extruded thermoplastic synthetic resin and having at least one open or closed channel and at least one outer surface exposed to ambient weather conditions, the improvement wherein the at least one surface exposed to ambient weather conditions is covered directly with a co-extruded protective layer comprising a polymeric material selected from the group consisting of a polymethyl methacrylate homopolymer, a methyl methacrylate copolymer and mixtures thereof.

22. The shaped article of claim 21, wherein said layer has a thickness of about 0.1 to about 1 mm.

23. The shaped member of claim 21, wherein said extrudable thermoplastic synthetic resin is selected from the group consisting of polyvinyl chloride, acrylonitrile-butadiene-styrene, polyethylene and polypropylene.

24. The shaped member according to claim 22, wherein said methyl methacrylate copolymer is obtained by copolymerization of a major portion of methyl methacrylate with another copolymerizable monomer selected from the group consisting of alkyl acrylate and aryl acrylate.

25. The shaped member according to claim 24, wherein said coplymerizable monomer is selected from the group consisting of butyl acrylate, ethyl acrylate and phenyl acrylate.

26. The shaped member according to claim 25, wherein said protective layer consists essentially of said polymeric material.

27. The shaped member according to claim 21, wherein said shaped member is a load-supporting member.

28. The shaped member according to claim 23, wherein said load-supporting member is a hollow member having a plurality of continuous channels or chambers extending longitudinally therethrough.

* * * * *